(12) United States Patent
Müller-Brahms

(10) Patent No.: US 7,818,700 B2
(45) Date of Patent: Oct. 19, 2010

(54) SYSTEM AND METHOD FOR VERIFICATION AND GENERATION OF TIMING EXCEPTIONS

(75) Inventor: Martin Müller-Brahms, Munich (DE)

(73) Assignee: Onespin Solutions GmbH, Munich (DE)

( * ) Notice: Subject to any disclaimer, the term of this patent is extended or adjusted under 35 U.S.C. 154(b) by 426 days.

(21) Appl. No.: 11/876,903

(22) Filed: Oct. 23, 2007

(65) Prior Publication Data
US 2008/0098271 A1 Apr. 24, 2008

(30) Foreign Application Priority Data
Oct. 23, 2006 (EP) .................... 06022162

(51) Int. Cl.
*G06F 17/50* (2006.01)
(52) U.S. Cl. ............................. 716/6; 716/18
(58) Field of Classification Search .......... 716/6, 716/18
See application file for complete search history.

(56) References Cited

U.S. PATENT DOCUMENTS

| | | | |
|---|---|---|---|
| 5,638,290 A | 6/1997 | Ginetti et al. | |
| 5,648,909 A | 7/1997 | Biro et al. | |
| 5,675,728 A | 10/1997 | Kunda et al. | |
| 5,764,525 A | 6/1998 | Mahmood et al. | |
| 6,964,027 B2* | 11/2005 | Kucukcakar et al. | 716/2 |
| 7,103,863 B2* | 9/2006 | Riepe et al. | 716/7 |
| 7,490,307 B2* | 2/2009 | Fomaciari et al. | 716/6 |
| 7,555,689 B2* | 6/2009 | Goswami et al. | 714/741 |
| 7,669,160 B2* | 2/2010 | Furnish et al. | 716/9 |
| 2004/0078767 A1* | 4/2004 | Burks et al. | 716/8 |
| 2005/0246673 A1* | 11/2005 | Charlebois et al. | 716/6 |
| 2008/0005710 A1* | 1/2008 | Fomaciari et al. | 716/6 |
| 2008/0216040 A1* | 9/2008 | Furnish et al. | 716/10 |
| 2009/0254874 A1* | 10/2009 | Bose | 716/6 |
| 2009/0327986 A1* | 12/2009 | Goswami et al. | 716/6 |

FOREIGN PATENT DOCUMENTS

EP 1 160 987 12/2001

* cited by examiner

*Primary Examiner*—Phallaka Kik
(74) *Attorney, Agent, or Firm*—24IP Law Group; Timothy R. DeWitt

(57) ABSTRACT

The invention relates to a method for verifying one or more exceptions in a logic circuit comprising the steps of: a first step of providing an initial representation of a logic circuit; a second step of indicating at least one exception for the logic circuit; a third step of introducing one or more potential malfunctions of the logic circuit related to the one or more exceptions into the representation of the logic circuit to produce a modified representation of the logic circuit; a fourth step of determining whether functional behavior of the modified representation of the logic circuit differs from functional behavior of the first representation of the logic circuit; and a fifth step of reporting a result relating to the difference in the functional behavior of the modified representation of the logic circuit from the functional behavior of the initial representation of the logic circuit.

18 Claims, 10 Drawing Sheets

SYSTEM AND METHOD FOR VERIFICATION AND GENERATION OF TIMING EXCEPTIONS

CROSS-REFERENCE TO RELATED APPLICATIONS

The present application claims priority to and the benefit of the filing date of European Patent Application Serial No. EP 06 022 162.9 filed on Oct. 23, 2006, which is hereby incorporated by reference in its entirety.

STATEMENT REGARDING FEDERALLY SPONSORED RESEARCH OR DEVELOPMENT

None.

BACKGROUND OF THE INVENTION

1. Field of the Invention

The present invention relates to the field of digital circuits. In particular, the present invention relates to the verification of digital circuits.

2. Brief Description of the Related Art

Digital or logic circuits are implemented in almost any electronic device available today and offer the possibility of integrating an increasing number of functions and features into devices without raising production costs considerably. However, with the increasing number of features and functions, the number of circuit elements and thereby the complexity of the digital or logic circuits has increased. Consequently, the effort undertaken to design the digital or logic circuits has enormously increased.

In usual design procedures an engineer or a team of engineers develops a design of the logic circuit or an assembly of the logic circuits that implements the desired functions. In order to represent or describe a design a number of description modes and methods have been developed describing a logic circuit at different levels. These description modes and methods include, for example, RTL or net list description.

Once the design for the logic circuit has been developed and described according to the requirements of the desired application, a chip layout of the logic circuit has to be designed before the chip production process is started. It has become evident that mistakes or unforeseen circuitry may cause malfunctions in the chip which results in high costs for the correction of the design once the chip production process has started. Therefore, verification methods have been introduced in order to verify that the design of the chip layout fulfils all the requirements of the desired logic circuit. These verification methods may be applied before the production process or even during the design steps in order to find any faults in the design of the chip layout as soon as possible.

The verification methods analyse the function and/or the layout of the design of the chip layout in order to simulate the function of the chip. Different types of the verification methods, i.e. timing verification or functional verification methods, are currently known in the art.

The aim of static timing analysis is to verify that a logic circuit, in particular a digital circuit, satisfies its timing constraints, i.e. that the logic circuit will function correctly when run at an intended speed.

It is state of the art in static timing analysis to check for potential setup (and hold) time violations by computing longest paths (with respect to gate and wire delays) through the logic circuit. It is well known that this check may be too conservative, because the check may find critical paths which cannot be activated while the chip is operating. This is due to the fact that static timing analysis performs a pure topological analysis of the logic circuit and does not take the functionality of the logic circuit into account. It is state of the art in static timing analysis to circumvent this problem by specifying so called timing exceptions. Timing exceptions are typically used for specifying paths to be false paths or to be multi-cycle paths. The timing exceptions are typically provided by the user of static timing analysis tools. The timing exceptions have the effect that those timing violations, which are specified to be exceptional, are simply ignored by the static timing analysis tool. It is evident that this procedure is error-prone. For example, static timing analysis may ignore relevant timing violations if the timing violation has been wrongly specified to be a timing exception, termed invalid timing exception which can lead to operational malfunction of the logic circuit. Timing violations that are correctly specified as timing exceptions are termed valid timing exception.

Therefore, there is a need for an automated system which allows to check whether a set of given timing exceptions or timing violations is valid or to find a set of valid timing exceptions that is fast and reliable even with a large logic circuits and large numbers of timing violations.

There are different published methods and available software tools which claim to solve this task at least partially. However, all of them suffer from different drawbacks. A large variety attacks the special case of false path exceptions. Most of them are trying to find a way to characterize a single path as false or true. It is well known, that these methods are either faulty, or too weak, or they need exact gate delay times. Only a few seem to be aware of the problem that a set of false path exceptions has to be analyzed as an entirety to decide whether it is valid or not.

U.S. Pat. No. 5,638,290 describes a method for removing critical false paths during logic optimization based on a redundancy removal algorithm using essentially thee steps: starting a timing verification, searching for critical paths, extracting critical cones. This method has to be iteratively repeated for as long as a critical path is false.

However, there is no method available to analyze different kinds of timing exceptions, e.g. multi cycle paths and false paths simultaneously.

Further, there is a need for an automated system and a method for checking exceptions or violations, in particular timing exceptions, in a logic circuit that is fast, reliable and applicable to complex logic circuits.

There is also a need for a method and a system for checking exceptions in a logic circuit that can be implemented in standard verification procedures.

It is therefore an object of the present invention to provide a system for verifying exceptions that allows the automated determination whether a set of exceptions is of influence for the proper function of the chip or not.

SUMMARY OF THE INVENTION

These and other objects of the present invention are solved by a method for verifying one or more exceptions in a logic circuit comprising: a first step of providing an initial representation of a logic circuit, a second step of indicating at least one exception for the logic circuit, a third step of introducing one or more potential malfunctions of the logic circuit related to the one or more timing exceptions into the initial representation of the logic circuit to produce a modified representation of the logic circuit, a fourth step of determining whether functional behaviour of the modified representation of the logic circuit differs from functional behaviour of the initial representation of the logic circuit, and a fifth step of reporting a result relating to the difference in the functional behaviour of the modified representation of the logic circuit from the functional behaviour of the initial representation of the logic circuit.

The method according to the invention verifies a set of exceptions in an efficient and automated way. Using the method of the invention, an exception that is verified may be considered a valid exception and an exception that can not be verified may be considered invalid.

The first representation of the logic circuit may thereby be in a description format known in the art such as an RTL or net list format, but other representations or description formats for a logic circuit may be used.

In a preferred embodiment of the invention the one or more exceptions are timing exceptions. The exceptions may also be any timing violation in the logic circuit. Thus the invention may be advantageously applied for the verification of timing exceptions of a logic circuit. Alternatively, the one or more exceptions are clock domain crossings or similar.

Timing exceptions which have been verified to be valid may be safely used by known procedures such as static timing analysis (STA) tools, place and route tools, or other tools.

According to the invention, an exception or a timing exception may be verified by introducing a potential malfunction into the representation of the logic circuits. In particular, the potential malfunction may be introduced by modifying the representation of the logic circuit, especially by duplicating shared parts of the logic and adding switches and new inputs which allow conditional fault induction to one of the duplicate logics while the other of the duplicate logics maintains its original functionality. It can be checked or verified, whether inducing a fault by switching on or off of the malfunction of the logic circuit in the modified representation has an influence on the function of the logic circuit, i.e. whether the functional behaviour of the logic circuit described by the modified representation differs from the function of the logic circuit described by the unmodified description.

The exception may also be verified for a particular use of the logic circuit. In general, the importance and/or validity of an exception may be different for different uses of the logic circuit. Thus an exception may be true in some instances while the exception is false in others.

In a preferred embodiment of the present invention, the malfunctions are caused by the exceptions.

In another preferred embodiment, the result in the fifth step indicates whether each of the one or more exceptions is acceptable for the initial representation of the logic circuit or reporting a sequence of events showing a faulty behaviour of the initial representation of the logic circuit under and/or for the indicated exception.

In a preferred embodiment at least a section of the circuit is represented by a directed acyclic graph comprising nodes and edges, and defining paths through the nodes, wherein each path runs from an input node to an output node.

In a further preferred embodiment the one or more timing exception defines a set of paths, the set comprising one or more timing exception paths. The one or more timing exception paths may comprise false paths or multi cycle paths but can be any type of path running between two nodes. The two nodes may thereby be input and/or output nodes of the logic circuit, but can be in principle any node of the represented circuit. A timing exception may thus be either a false path exception or a multi cycle path exception.

In a further preferred embodiment the third step further comprises duplicating the nodes and/or edges in the representation of the logic circuit until every input node of the modified representation of the logic circuit is either a start point of one of the timing exceptions paths or a start point of one of a non-timing exception paths. In this way, the initial representation of the logic circuit is modified into a modified representation that can be easily separated into at least two parts. One part of the modified representation does not contain any path specified as timing exception. Another part of the modified representation contains solely paths specified as timing exception.

In another embodiment of the invention the functional behaviour of the initial representation of the logic circuit and/or the modified representation of the logic circuit is defined in terms of 3-valued (X-valued) simulation comprising gate delay times and net delay times.

In yet a further embodiment of the present invention the method comprises one or more multiplexer switches to introduce the malfunction into the representation of the logic circuit. Multiplexer switches may be integrated into the modified representation of the logic circuit in order to switch on and/or off introduction of fault values along paths or sections of the logic circuit for determining the function of the logic circuit, i.e. whether the timing exceptions modify the functional behaviour of the logic circuit. Using a plurality of multiplexer switches introduced at different places in the representation of the logic circuit allows the verification of a plurality of combinations of timing exceptions.

In another preferred embodiment of the invention a plurality of initial representations of the logic circuit and modified representation of the logic circuit are connected sequentially to represent a multiple cycle simulation. The timing exception may herein comprise multi-cycle paths.

In a further embodiment of the invention, a static 3-valued model is defined and at least one formal verification method is used to determine whether the functional behaviour of the modified representation of the logic circuit differs from the functional behaviour of the initial representation of the logic circuit.

In yet a further embodiment the timing exceptions are grouped in subcategories of timing exceptions, one subcategory of timing exceptions for multi-cycle paths of same cycle length and identical start point, and/or one or more subcategories containing false paths, so that a static model for potential sequential malfunction can be constructed.

Thereby, the third step may further comprise duplicating the nodes and/or edges in the representation of the logic circuit until every input node of the modified representation of the logic circuit is either a start point of a false path, a start point of one subcategory of multi-cycle path or a start point of non timing exceptions paths.

In all the embodiments of the invention the logic circuit represented may be a section of an integrated circuit. A complete integrated circuit can also be represented.

The invention is also advantageously applied in a method for verifying logic circuits comprising the steps of generating a representation of a logic circuit, identifying timing exception for the logic circuits verifying the timing exceptions using the method according to any of the embodiments of the invention discussed above.

The method may also be used in a computer program product that allows for execution on a computer.

In a preferred embodiment, the present invention is a method for verifying one or more exceptions in a logic circuit, the method comprising the steps of providing an initial representation of a logic circuit, indicating at least one exception for the logic circuit, introducing one or more potential malfunctions of the logic circuit related to the one or more exceptions into the representation of the logic circuit to produce a modified representation of the logic circuit, determining whether functional behaviour of the modified representation of the logic circuit differs from functional behaviour of the first representation of the logic circuit, and reporting a result relating to the difference in the functional behaviour of the modified representation of the logic circuit from the functional behaviour of the initial representation of the logic circuit. The one or more exceptions may be, for example, timing exceptions. The malfunction may be caused by the indicated one or more exceptions. Further, in one embodiment, the result in the reporting step indicates whether each of the one or more exceptions is acceptable for the initial representation of the logic circuit or reporting a sequence of events showing a faulty behaviour of the initial representation of the logic circuit for the indicated exception. Further, in one embodiment, at least a section of the circuit may be represented by a directed acyclic graph comprising nodes and edges, and defining paths through the nodes, wherein each path runs from an input node to an output node. In another embodiment, the one or more exceptions are timing exceptions and the one or more timing exception defines a set of paths, the set comprising one or more timing exception path. The one or more timing exception paths may comprise false paths. In another embodiment, introducing step further comprises duplicating the nodes and/or edges in the representation of the logic circuit until every input node of the modified representation of the logic circuit is either a start point of timing exceptions paths or a start point of non timing exceptions paths. In still another embodiment, the functional behaviour of the initial representation of the logic circuit and/or the modified representation of the logic circuit is defined in terms of 3-valued (X-valued) simulation comprising gate delay times and net delay times. In other embodiments, the method further comprises one or more multiplexer switches to introduce the malfunction into the representation of the logic circuit. Still further, a plurality of initial representations of the logic circuit and modified representation of the logic circuit may be connected sequentially to represent a multiple cycle simulation. The one or more timing exception may define a set of paths, the set comprising one or more timing exception path and wherein the timing exception paths comprise multi-cycle paths. Further, a static 3-valued model may be defined and at least one formal verification method is used to determine whether the functional behaviour of the modified representation of the logic circuit differs from the functional behaviour of the initial representation of the logic circuit. In another embodiment, the one or more exceptions are timing exceptions and the one or more timing exception defines a set of paths, the set comprising one or more timing exception path and the timing exceptions are grouped in subcategories of timing exceptions, one subcategory for every cycle length of multi-cycle path and/or for false path, so that a static model for potential sequential malfunction can be simulated. The introducing step may further comprise duplicating the nodes and/or edges in the representation of the logic circuit until every input node of the modified representation of the logic circuit is either a start point of a false path, a start point of one subcategory of multi-cycle path or a start point of non timing exceptions paths. The logic circuit may be a section of an integrated circuit.

In another embodiment, the present invention is a method for verifying logic circuits comprising the steps of generating a representation of a logic circuit, identifying timing exception for the logic circuits and verifying the timing exceptions. The verifying step comprises the steps of a first step of providing an initial representation of a logic circuit, a second step of indicating at least one exception for the logic circuit, a third step of introducing one or more potential malfunctions of the logic circuit related to the one or more exceptions into the representation of the logic circuit to produce a modified representation of the logic circuit, a fourth step of determining whether functional behaviour of the modified representation of the logic circuit differs from functional behaviour of the first representation of the logic circuit, and a fifth step of reporting a result relating to the difference in the functional behaviour of the modified representation of the logic circuit from the functional behaviour of the initial representation of the logic circuit.

In another embodiment, the present invention is a computer program product for verifying logic circuits applying a method comprising the steps of a first step of providing an initial representation of a logic circuit, a second step of indicating at least one exception for the logic circuit, a third step of introducing one or more potential malfunctions of the logic circuit related to the one or more exceptions into the representation of the logic circuit to produce a modified representation of the logic circuit, a fourth step of determining whether functional behaviour of the modified representation of the logic circuit differs from functional behaviour of the first representation of the logic circuit, and a fifth step of reporting a result relating to the difference in the functional behaviour of the modified representation of the logic circuit from the functional behaviour of the initial representation of the logic circuit.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention.

BRIEF DESCRIPTION OF THE DRAWINGS

For a more complete understanding of the present invention and the advantages thereof, reference is now made to the following description and the accompanying drawings, in which:

FIG. 3 shows the longest paths found within the example of FIG. 2a.

DETAILED DESCRIPTION OF THE PREFERRED EMBODIMENTS

Figure 1A:
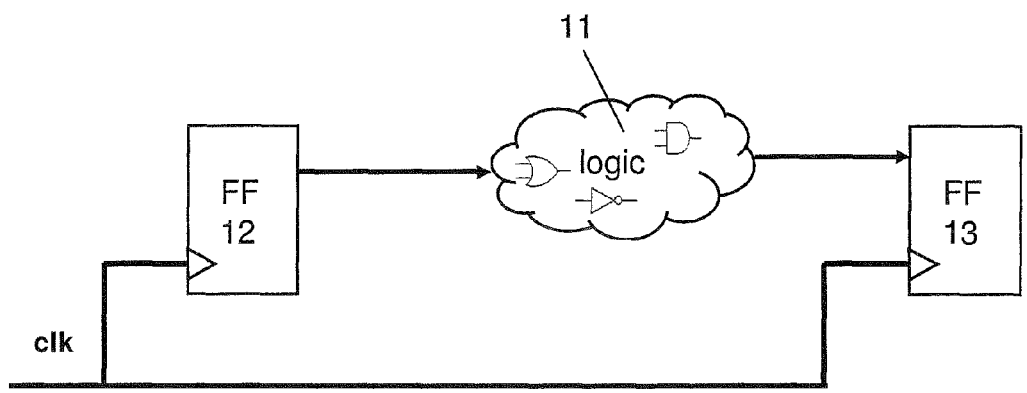
FIGS. 1a and 1b illustrate the task of static timing analysis and the problem of false paths.

FIG. 1a shows a prototypical part of a sequential circuit with a first flip-flop (FF) 12 and as second FF 13. Both of the FFs 12, 13 are clocked by the same clock and a data input of second FF 13 depends on some combinational logic 11 driven by the first FF 12. Static timing verification has to check (so called setup check) that after a first clock pulse arrives at the first FF 12 the data input of the second FF 13 will be stable before a second clock pulse arrives at the second FF13. This check is done by checking whether the length of a path from a clock input clk to the first FF 12 plus the length of the longest path through the combinational logic 11 is shorter than the length of a path from the clock input clk to the second FF 13 plus the intended clock period.

Figure 1B:
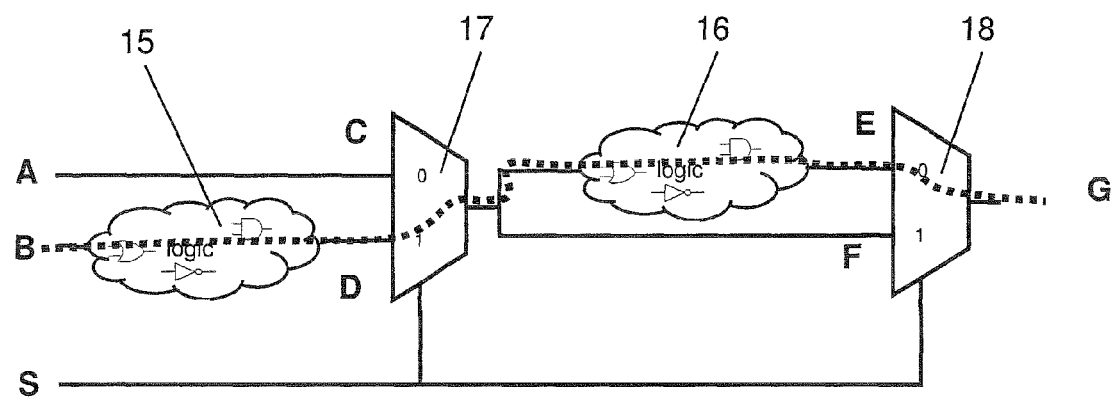

FIG. 1b illustrates a simple false path, demonstrating that the pure topological check done by static timing analysis may be too conservative. Assuming that the combinational circuit of FIG. 1b, which comprises a first combinational logic 15, a second combinational logic 16, a first multiplexer 17 and a second multiplexer 18, is part of the combinational logic 11 in FIG. 1a, the longest path used for the setup time check will probably go through the first combinational logic 15, the first multiplexer 17, the second combinational logic 16, and the multiplexer 18 (dotted line). As the first multiplexer 17 and the second multiplexer 18 are controlled by a same signal S it is not possible that this longest path is causing the data arrival time at the output G of the second multiplexer 18 and therefore the data arrival time at the data input of the second FF 13 of FIG. 1a. It will therefore be safe to simply ignore all such paths in the setup time check for the second FF 13. A user of static timing analysis may therefore want to specify these paths as a valid false path timing exception.

Figure 2A:
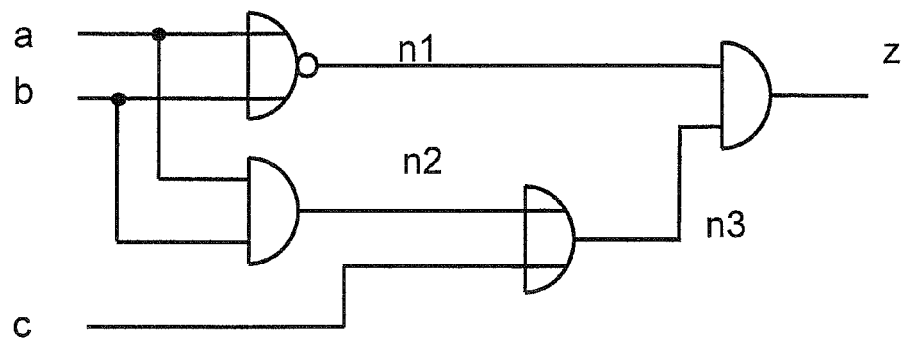
FIGS. 2a and 2b show an example of X-valued timing simulation.
Figure 2B:
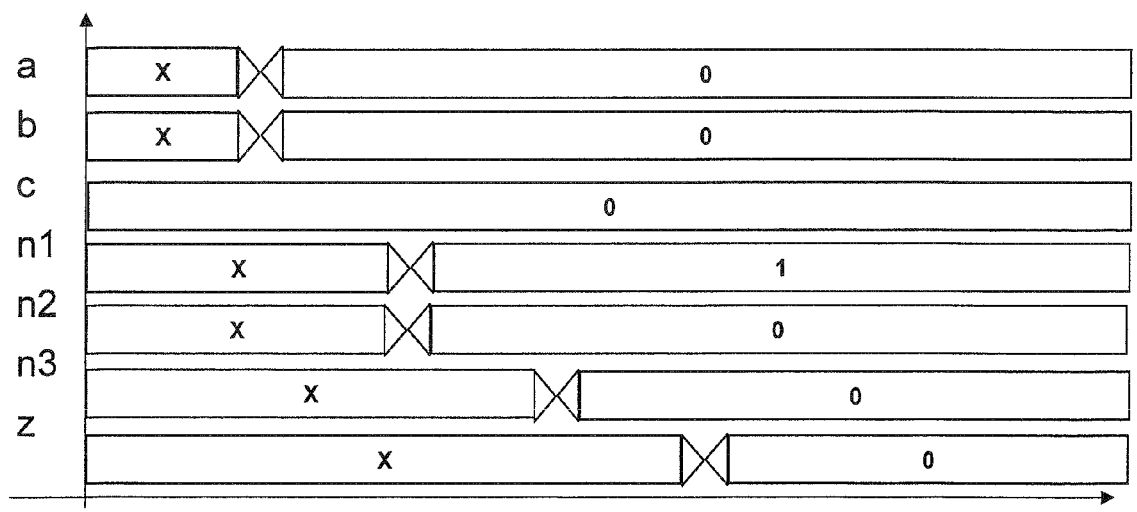

FIGS. 2a and 2b illustrate X-valued timing simulation which serves as an operational model. This operational model can be used to illustrate the meaning of valid timing exception or a valid set of timing exceptions. In X-valued timing simulation the value X is used for an undefined value. First all of the signals are undefined. At some time point, a defined value (0 or 1) is assigned to the inputs of the circuit. This value assignment is propagated through the circuit taking into account functionality and delay times of each of the gates in the circuit, e.g. the output of an AND gate with two inputs is determined after one of the inputs has become 0 or both of the inputs have become 1. Therefore in X-valued timing simulation the output of the AND gate becomes 1 at some specified delay after both of the inputs have become 1 and the output of the AND gate becomes 0 at some specified delay after the first input has become 0 (the other input may still be X).

FIG. 2b shows how an assignment of value 0 to the inputs propagates through the circuit given in FIG. 2a assuming unit delay at each of the gates. Exact data arrival time can be computed for every one of the input assignments using X-valued timing simulation. Since the number of input assignments is exponential to the number of the inputs, it is not feasible to do this simulation for all input assignments (and all potential gate delays) in practice. However, X-valued simulation can be used as a reference model and it can be defined that a set of timing exceptions is valid if and only if for all gate delays the longest path found by static timing analysis (under given exceptions) is not shorter than data arrival time determined by X-valued simulation.

Figure 3:
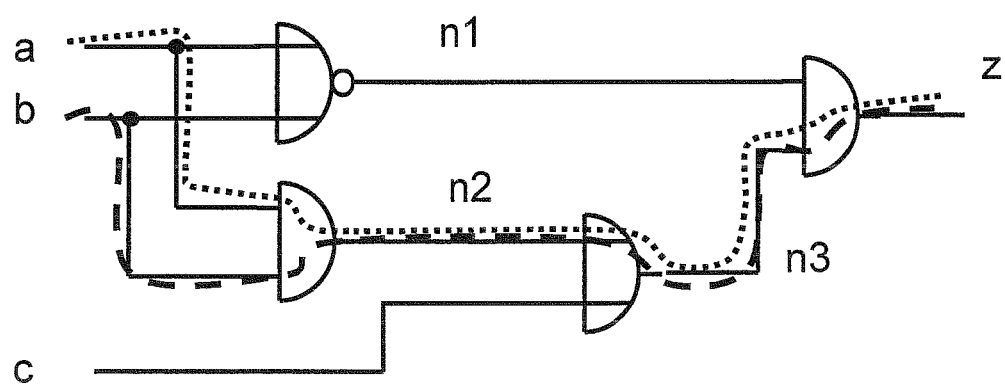

If a unit delay for every gate in the circuit given in FIG. 2a is not assumed, the two paths (a,n2,n3,z) and (b,n2,n3,z) (shown as dotted and dashed line in FIG. 3, respectively) might have different lengths. X-valued simulation will demonstrate that the data arrival time at z will never be determined by the length of the longer one of these two paths but might be determined by the length of the shorter one. Therefore specifying solely (a,n2,n3,z) as a false path is a valid set of timing exceptions, and specifying solely (b,n2,n3,z) is as well a valid set of timing exceptions. However, specifying both of the paths as false paths is not a valid set of timing exceptions.

Figure 4A:
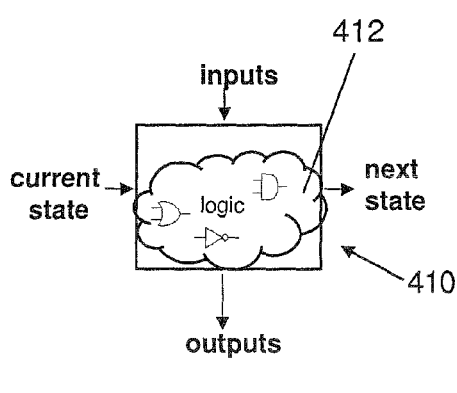
FIGS. 4a and 4b show how timing exceptions are modelled according to the invention.
Figure 4B:
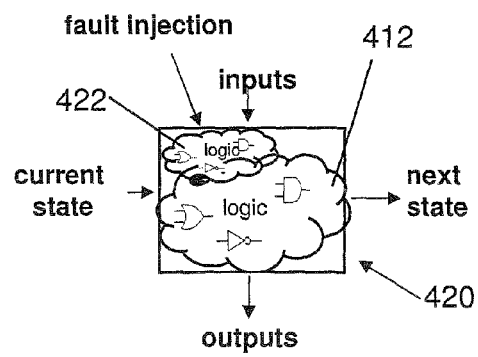

FIGS. 4a and 4b give a general graphical representation of the embodiment of this invention. A sequential circuit 410 can always be presented as depicted in FIG. 4a as a combinational logic 412 depending on inputs and current states as well as producing outputs and next states. Given a set of timing exceptions the sequential circuit 410 can be modified to obtain a fault modelling circuit 420 depicted in FIG. 4b. The fault modelling circuit 420 in FIG. 4b has some additional inputs and a fault injection logic 422 for fault injection. A set of timing exceptions related to the combinational logic 412 can be split into subclasses, so that for every subclass there is one new input which can be used to switch the potential fault introduced by this subclass of timing exceptions on and off. If all of the new fault injecting inputs of the fault injection logic 422 in FIG. 4b are set to 0, the fault modelling circuit 420 combined of the combinational logic 412 and the fault injection logic 422 is by construction functionally equivalent to the sequential circuit 410 and the combinational logic 412 of FIG. 4a. If all of the fault injecting inputs are set to 1 the sequential circuit 410 and the fault modelling circuit 420 are functionally equivalent if and only if the whole set of timing exceptions is valid. If some fault injecting inputs are set to 1 the sequential circuit 410 the fault modelling circuit 420 are functionally equivalent if and only if the ensemble of the subclasses corresponding to the fault injecting inputs set to 1 forms a valid set of timing exceptions. Thus, by setting fault injection inputs selectively to 1 any combination of timing exceptions can be verified and invalid timing exceptions can be identified in a time efficient way.

Figure 5A:
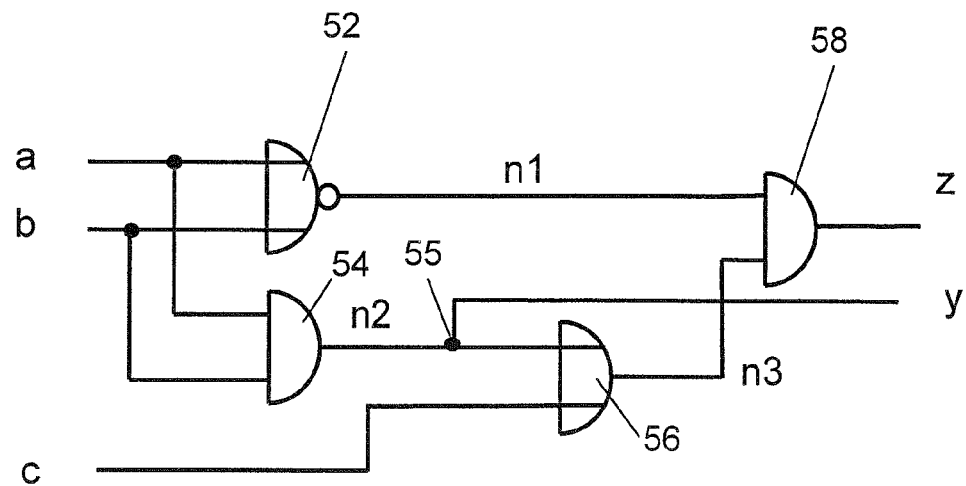
FIGS. 5a and 5b, 5c and 5d show how representations of a logic circuit can be modified to model potential malfunction introduced by timing exceptions.
Figure 5B:
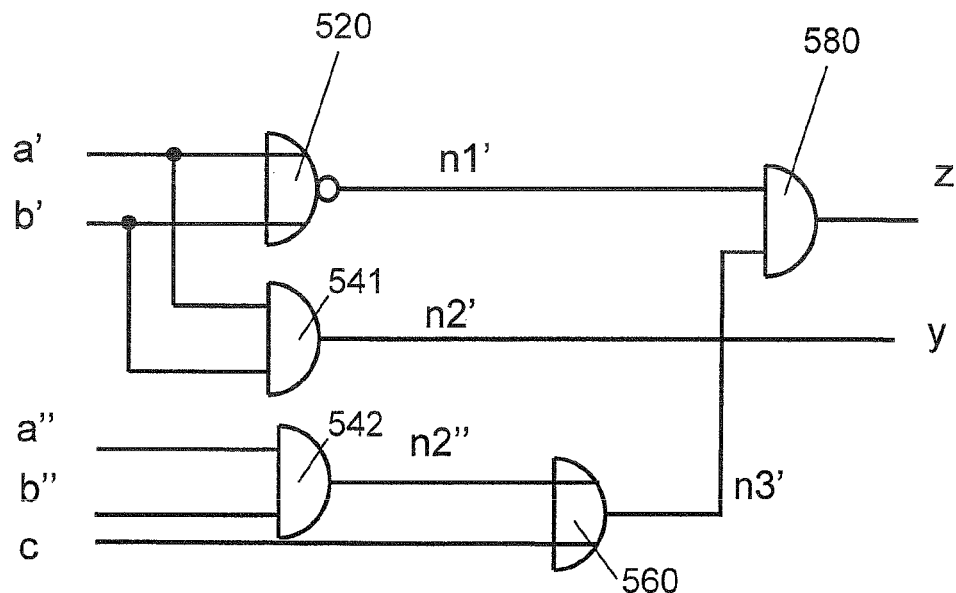
Figure 5C:
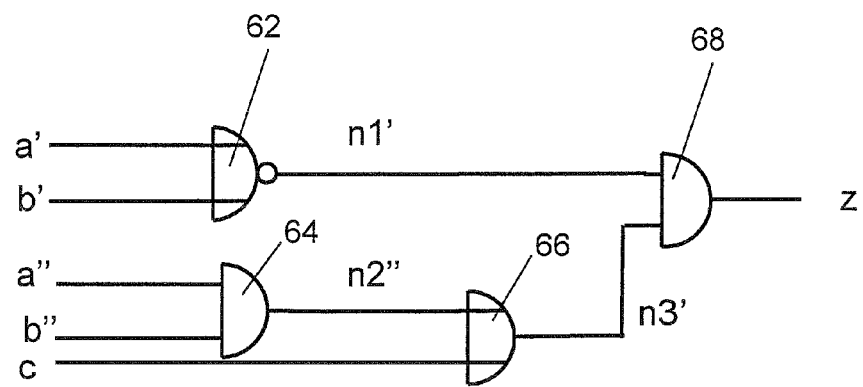

FIGS. 5a to 5c illustrate—using the example from FIG. 2a—how a circuit of the form depicted in FIG. 4a can be transformed to a fault modelling circuit 420 of the form depicted in FIG. 4b. The transformation to the fault model is done in two steps: first some parts of the logic have to be duplicated, until every input can be uniquely associated to some (subclass of) timing exceptions or to the exception free part. In a second step a fault input fi and a switch are added for each timing exception subclass.

FIG. 5a reproduces FIG. 2a. To illustrate the problem of duplicating logic an additional output y is added. Assuming that a set containing the two false path exceptions (a,n2,n3,z) and (b,n2,n3,z) is given and in order to split these two false path exceptions into two subclasses, each subclass containing one single element, the logic of circuit of FIG. 5a has to be duplicated to obtain the circuit illustrated in FIG. 5b. In the particular case shown, an AND-gate 54 with inputs a and b and output n2 is duplicated into a first AND-gate 541 with first inputs a' and b' and a first output n2' corresponding to a first output y and into a second AND-gate 542 with second inputs a" and b" and a second output n2" corresponding to the branch of n2 applied to a gate 56. This new representation of the circuit has the property that every path starting at a' or b' is not contained in the set of timing exceptions, that every path starting at a" (in the example shown there is only one path) is contained in the first subclass of timing exceptions and every path starting at b" (in the example shown there is only one path) is contained in the second subclass. Under the assumption a'=a" and b'=b" the circuits 5a and 5b are functionally equivalent by construction.

Figure 5D:
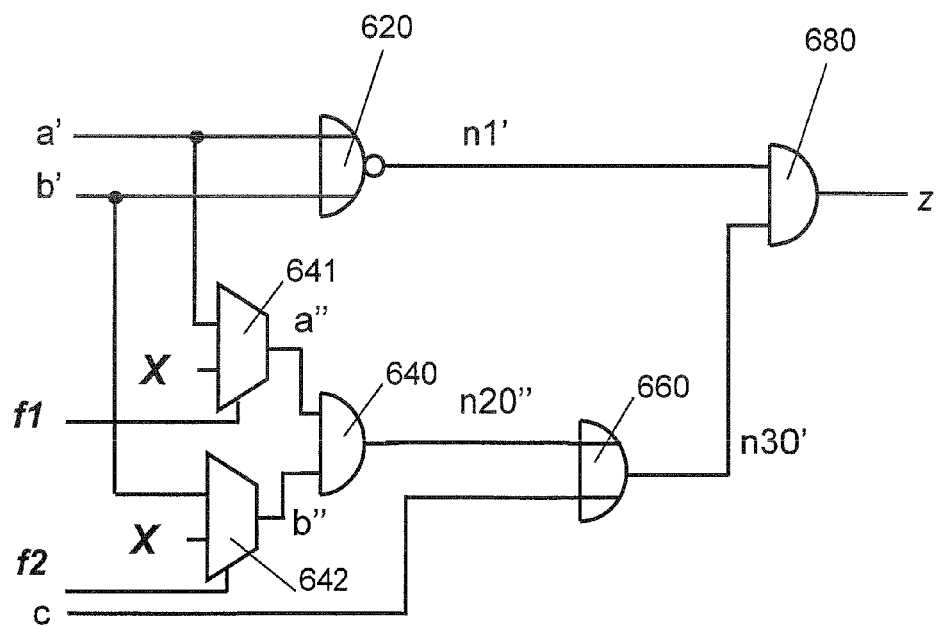

Without the output y, less duplication of gates would be necessary. The AND gate 541 could be skipped and the circuit depicted in FIG. 5c is obtained. FIG. 5d illustrates how a circuit can be constructed from FIG. 5c, which has an input for every subclass of timing exceptions, which allows for analysing faulty behaviour for every combination of subclasses. Thereby a first multiplexer switch 641 and a second multiplexer switch 642 are introduced to inject fault into the signal a' and b', respectively.

If both of the inputs f1 and f2 in FIG. 5d are set to 0, then the circuit of FIG. 5d is functionally equivalent to that of the circuit that of FIG. 2a by construction. If the input f1 is set to 1 and the input f2 is set to 0 then it is not obvious but it can be shown, e.g. using formal equivalence checking or property checking techniques, that the circuits of FIGS. 5d and 2a still are functionally equivalent. The same is true if the input f1 is set to 0 and the input f2 is set to 1. If the input f1 is set to 1 and the input f2 is set to 1 then the circuit of FIGS. 5d and 2a are not functionally equivalent any more, but there is an assignment to a', b' and c' which makes a value X occur at output z in circuit of FIG. 5d. From this analysis it can be concluded that a set of timing exceptions consisting of both false paths is invalid, but that the set of timing exception is valid if it has only one of these false paths as timing exception.

Figure 6A:
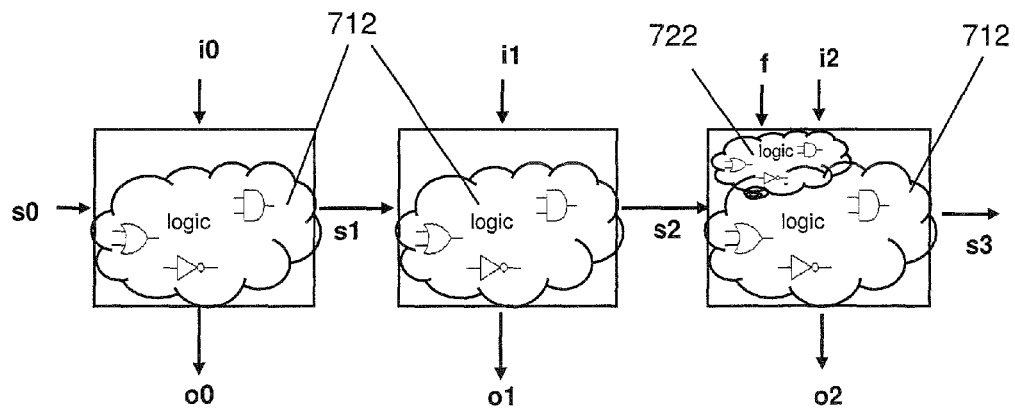
FIGS. 6a and 6b show how malfunctions are introduced in a sequential context according to one embodiment of the invention.
Figure 6B:
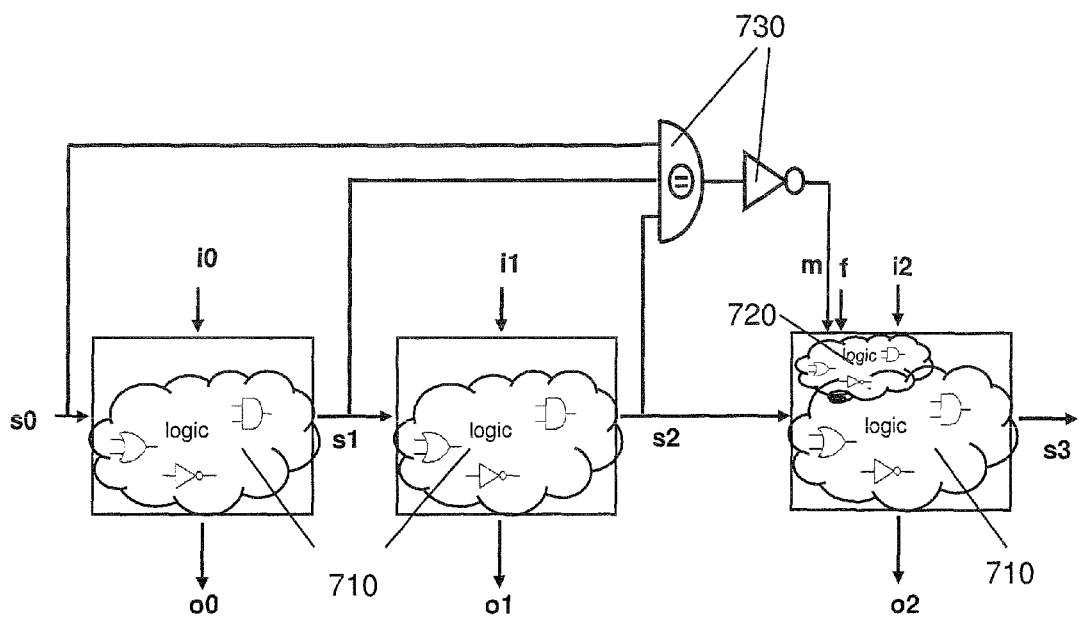

FIGS. 6a and 6b show how a fault model of type shown in FIG. 4b can be analyzed in a sequential context using the combinational representation of the sequential circuit given in FIG. 4a. This representation can be used to build a combinational model of n sequential steps of the circuit 712 by n copies of 4a where the next states of copy i are fed to the states of copy i+1. In FIG. 6a a model for n=3 is shown where in the third step a fault model as explained with respect to FIG. 6b and indicated as fault inducing logic 722 in FIG. 6a is introduced. This has the advantage that arbitrary assignments to s2 are not allowed when checking for potential X values at s3 or o2, but only those assignments to s2 are allowed, which can occur in the given sequential context. This sequential analysis can be further improved if the set of timing exceptions contains multi cycle paths. Assuming that the circuit contains a flip flop ff and therefore ff0, ff1, ff2, ff3 denote one single signal in the state signals s0, s1, s2, s3 respectively and further assuming that there is subclass of timing exceptions containing "3-cycle paths" starting all at the flip flop ff and going through the logic 712, the introduction of a potential fault introduced by this subclass may be suppressed for those cases where the value of ff did not change for the last 3 cycles. FIG. 6b demonstrates how this can be modelled: Some switching logic 730 is added which switches off the fault from this subclass if and only if ff and thus signals ff0, ff1 and ff2 had the same value within the 3 last steps.

Figure 7:
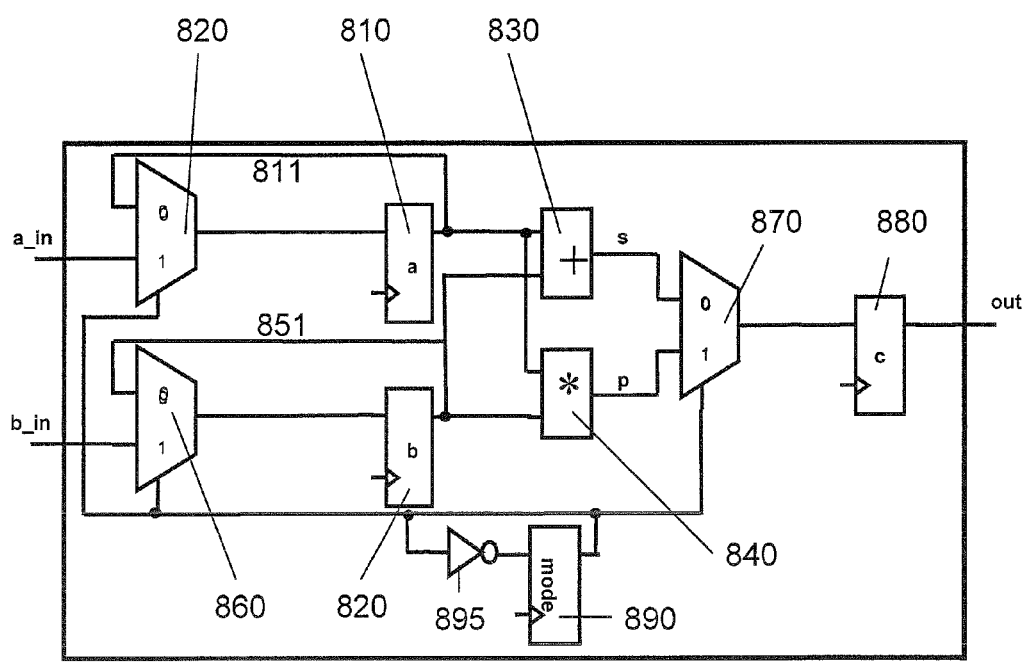
FIG. 7 shows an example of a sequential logic circuit.

FIG. 7 shows a detailed example of a sequential logic circuit or a section of a sequential logic circuit with storing elements a 810, b 820, c 880, and mode 890 (whereby each of the storing elements a 810, b 820, c 880 may consist of one or more flip flops and mode is one single bit.). In every time step the mode 890 switches value between 0 and 1 e.g. by use of an inverter 895. Depending on the current value of mode 890, the storing element c 880 stores the sum or the product of the values of the storing element a 810 and the storing element b 820. Depending on the current value of mode 890, the storing element a 810 and the storing element b 820 keep their values or are updated according to signal a_in and signal b_in. It will be demonstrated how the invention can be used to show that a set of timing exceptions consisting of two 2-cycle paths (a,p,c) and (b,p,c) is valid.

Figure 8A:
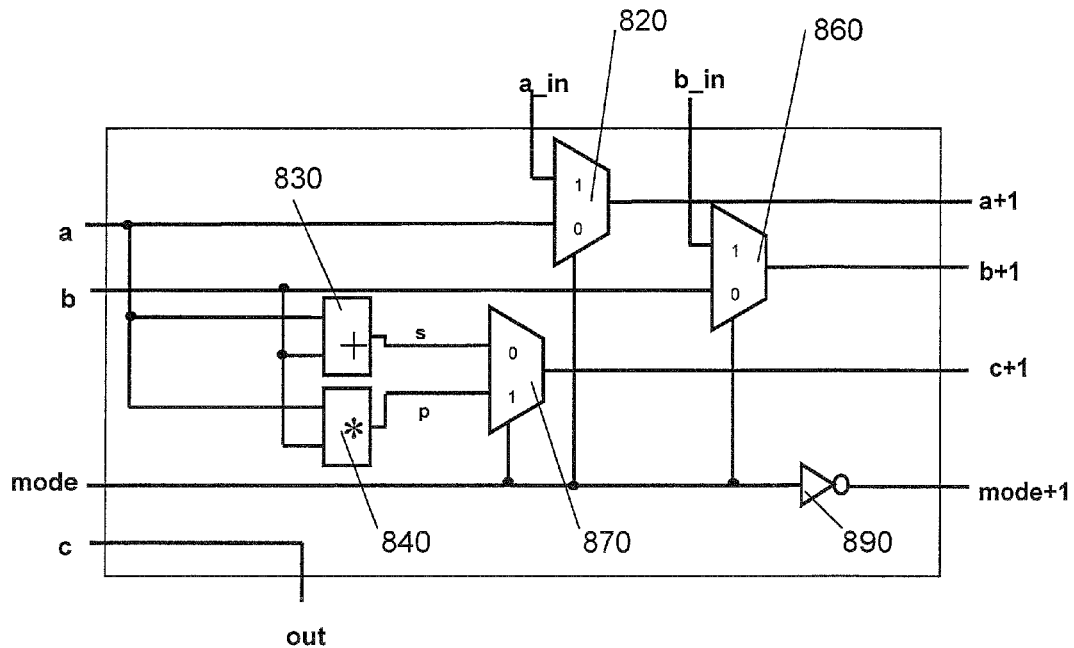
FIG. 8a shows the logic of FIG. 7 in a combinational representation.
Figure 8B:
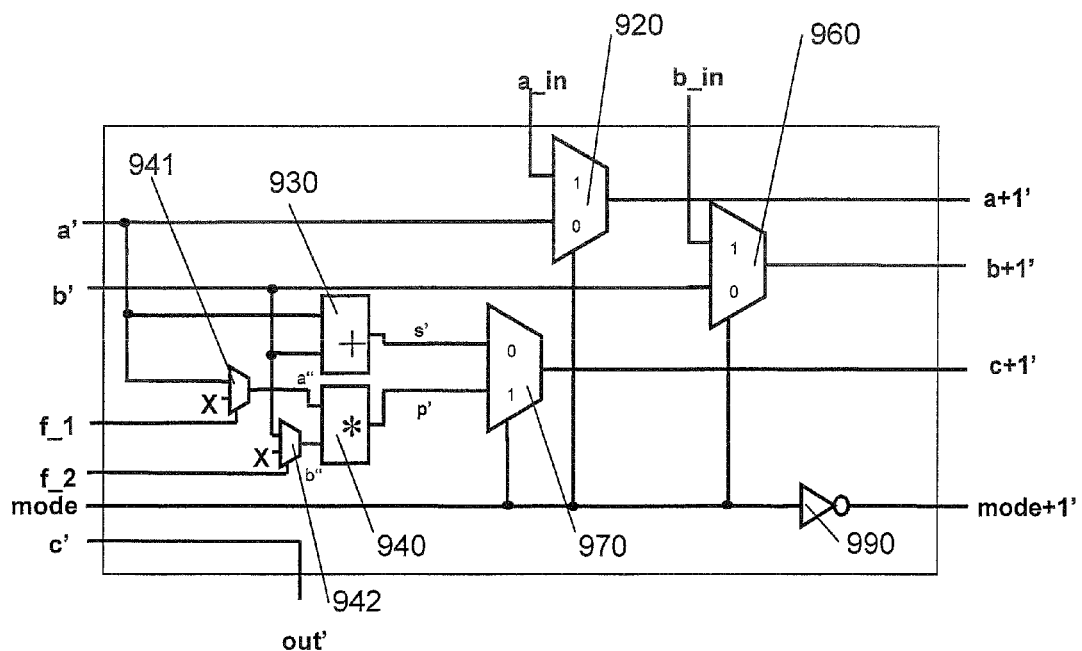
FIG. 8b shows a modified representation of the circuit of FIG. 8a with introduced malfunctions.

First, the representation of the circuit shown in FIG. 7 is transformed to a pure combinational representation (like in FIG. 4a) obtaining the circuit depicted in FIG. 8a. The combinational representation of the circuit depicted in FIG. 8a represents the same circuit and is therefore functionally identical to the representation of the circuit shown in FIG. 7. This combinational representation of the circuit is then, according to the invention, transformed to a fault model (like in FIG. 4b) obtaining a modified representation of the circuit depicted in FIG. 8b. The representation of the circuit depicted in FIG. 8b is modified with an input for every subclass of timing exceptions, which allows for analysing faulty behaviour for every combination of subclasses. Thereby a first multiplexer switch 941 and a second multiplexer switch 942 are introduced to inject fault values X into the signals a' and b' before they are respectively applied as signals a" and b" to multiplier 940. Both the first multiplexer switch 941 and the second multiplexer switch 942 are individually controlled by fault injection inputs f1 and f2, respectively.

If both of the fault injection inputs f1 and f2 in FIG. 8b are set to 0, than the modified circuit of FIG. 8b is functionally equivalent to that of the circuit of FIG. 8a by construction.

Figure 9:
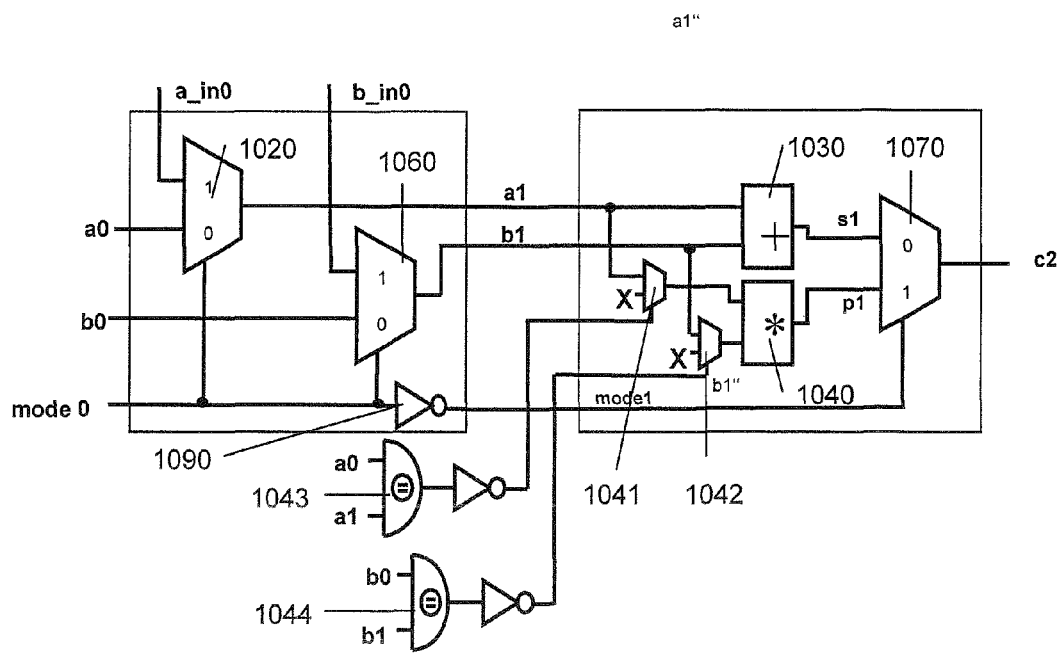
FIG. 9 shows a combinatorial representation of two time steps of the circuit of FIGS. 8a and 8b where a context dependent malfunction for a two cycle path is introduced.

From the circuits depicted in FIGS. 8a and 8b a fault model for two time steps can be constructed as explained with respect to FIG. 6b. The resulting fault model can be seen in FIG. 9. In FIG. 9 all logic which is not relevant to analyze the value at an output c2 is left out. It is easy to see that the fault value X can never occur at the output c2 in the circuit of FIG. 9. Therefore the fault model is functionally equivalent to the fault free model and as a result the modelled timing exceptions are valid. Only two cases have to be distinguished in order to see that the values of signal c2 can never become X: mode0=0 and mode0=1. If mode0 is 0 then the multiplexers 1020 and 1060 are switched in a way that a0=a1 and b0=b1. Under this condition, the faults injection is switched off by logic elements 1043 and 1044, respectively, and the outputs a1" and b1" of 1041 and 1042 are set to the values of a1 and b1, respectively. No X value is introduced to an input of a multiplier 1040, therefore no X value is read at the output c2. On the other hand if mode0 is 1, then mode1 is 0 and a multiplexer 1070 switches to the result of an adder 1030. Again no X value can be read at the output c2.

It is obvious to a person skilled in the art that all circuits shown are illustrated by way of example only. The circuits shown may be regarded as simplified examples for easier understanding of the invention. Circuits usually applied in the field and within the invention will be much more complex than the circuits shown. It has to be noted that all the circuit shown can be a section or a part of a greater integrated circuit.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. Method for verifying one or more exceptions in a logic circuit, the method comprising the steps of:
   a first step of providing an initial representation of a logic circuit,
   a second step of indicating at least one exception for the logic circuit,
   a third step of introducing one or more potential malfunctions of the logic circuit related to the one or more exceptions into the representation of the logic circuit to produce a modified representation of the logic circuit,
   a fourth step of determining by a computer whether functional behavior of the modified representation of the logic circuit differs from functional behavior of the first representation of the logic circuit, and
   a fifth step of reporting a result relating to a difference in the functional behavior of the modified representation of the logic circuit from the functional behavior of the initial representation of the logic circuit.

2. Method for verifying one or more exceptions in a logic circuit according to claim 1, wherein the one or more exceptions are timing exceptions.

3. Method for verifying one or more exceptions in a logic circuit according to claim 1, wherein the malfunction is caused by the indicated one or more exceptions.

4. Method for verifying one or more exceptions in a logic circuit according to claim 1, wherein the result in the fifth step indicates whether each of the one or more exceptions is acceptable for the initial representation of the logic circuit or reporting a sequence of events showing a faulty behavior of the initial representation of the logic circuit for the indicated exception.

5. Method for verifying one or more exceptions in a logic circuit according to claim 1, wherein at least a section of the circuit is represented by a directed acyclic graph comprising nodes and edges, and defining paths through the nodes, wherein each path runs from an input node to an output node.

6. Method for verifying exceptions in a logic circuit according to claim 5, wherein the one or more timing exception defines a set of paths, the set comprising one or more timing exception path.

7. Method for verifying exceptions in a logic circuit according to claim 6, wherein the one or more timing exception paths comprise false paths.

8. Method for verifying exceptions in a logic circuit according to claims 6, wherein the third step further comprises duplicating the nodes and/or edges in the representation of the logic circuit until every input node of the modified representation of the logic circuit is either a start point of timing exceptions paths or a start point of non timing exceptions paths.

9. Method for verifying exceptions in a logic circuit according to claim 1, wherein the functional behavior of the initial representation of the logic circuit and/or the modified representation of the logic circuit is defined in terms of 3-valued (X-valued) simulation comprising gate delay times and net delay times.

10. Method for verifying exceptions in a logic circuit according to claim 1, further comprising one or more multiplexer switches to introduce the malfunction into the representation of the logic circuit.

11. Method for verifying exceptions in a logic circuit according to claim 1, wherein a plurality of initial representations of the logic circuit and modified representation of the logic circuit are connected sequentially to represent a multiple cycle simulation.

12. Method for verifying exceptions in a logic circuit according to claim 11, wherein the one or more timing exception defines a set of paths, the set comprising one or more timing exception path and wherein the timing exception paths comprise multi-cycle paths.

13. Method for verifying exceptions in a logic circuit according to claim 11, wherein a static 3-valued model is defined and at least one formal verification method is used to determine whether the functional behavior of the modified representation of the logic circuit differs from the functional behavior of the initial representation of the logic circuit.

14. Method for verifying exceptions in a logic circuit according to claim 13 in combination with claim 6, wherein the timing exceptions are grouped in subcategories of timing exceptions, one subcategory for every cycle length of multi-cycle path and/or for false path, so that a static model for potential sequential malfunction can be simulated.

15. Method for verifying exceptions in a logic circuit according to claim 14, wherein the third step further comprises duplicating the nodes and/or edges in the representation of the logic circuit until every input node of the modified representation of the logic circuit is either a start point of a false path, a start point of one subcategory of multi-cycle path or a start point of non timing exceptions paths.

16. Method for verifying exception in a logic circuit according to claim 1, wherein the logic circuit is a section of an integrated circuit.

17. A method for verifying logic circuits comprising the steps of:
   generating a representation of a logic circuit,
   identifying timing exception for the logic circuits
   verifying by a computer the timing exceptions using comprising the steps of:
      a first step of providing an initial representation of a logic circuit,
      a second step of indicating at least one exception for the logic circuit,
      a third step of introducing one or more potential malfunctions of the logic circuit related to the one or more exceptions into the representation of the logic circuit to produce a modified representation of the logic circuit,
      a fourth step of determining whether functional behavior of the modified representation of the logic circuit differs from functional behavior of the first representation of the logic circuit, and
      a fifth step of reporting a result relating to a difference in the functional behavior of the modified representation of the logic circuit from the functional behavior of the initial representation of the logic circuit.

18. A computer program product embodied in a non-transitory computer readable medium, which when executed by a computer, causes the computer to implement a method for verifying logic circuits applying a method comprising the steps of:
   a first step of providing an initial representation of a logic circuit,
   a second step of indicating at least one exception for the logic circuit,
   a third step of introducing one or more potential malfunctions of the logic circuit related to the one or more exceptions into the representation of the logic circuit to produce a modified representation of the logic circuit, a fourth step of determining whether functional behavior of the modified representation of the logic circuit differs from functional behavior of the first representation of the logic circuit, and a fifth step of reporting a result relating to a difference in the functional behavior of the modified representation of the logic circuit from the functional behavior of the initial representation of the logic circuit.

* * * * *